Patented Aug. 7, 1945

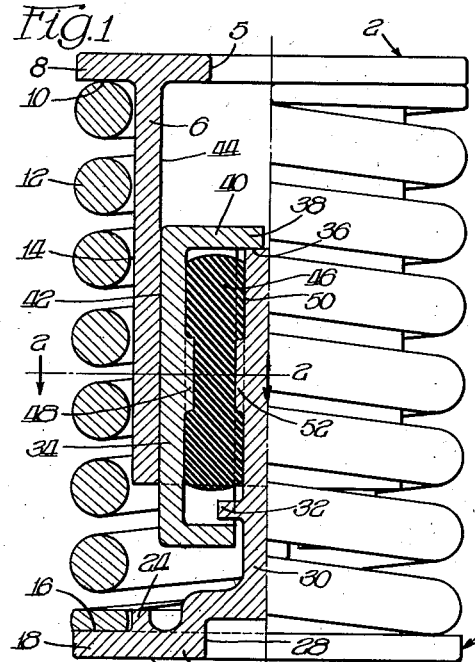

2,381,404

UNITED STATES PATENT OFFICE 2,381,404

FRICTION ABSORBING DEVICE

Robert B. Cottrell, Chicago, Ill., assignor to American Steel Foundries, Chicago, Ill., a corporation of New Jersey Application February 21, 1941, Serial No. 379,941

17 Claims. (Cl. 267—9)

This invention is directed to a spring assembly and a friction absorbing device in conjunction therewith, sometimes generally designated a snubber.

The general object of my invention is to devise a relatively simple form of coil spring and snubber combination in which the parts will be suitable for long wear and convenient for assembly while, at the same time, meeting the various conditions imposed by practical manufacturing requirements.

A specific object of my invention is to devise a snubber having a coil spring and a friction device housed therein wherein relatively large frictional areas may be utilized and in which a compression spring in the form of a rubber pad may be availed of to supply the pressure between the friction surfaces.

In one modification of my invention, the friction surfaces may be of complementary arcuate form on a housing follower and on the enclosed shoes actuated by the opposite follower. In other modifications, the friction surfaces may be flat or a plurality of flat surfaces angularly arranged with respect to each other.

My invention comprehends a snubber arrangement of the type described comprising a top follower with a barrel portion extending within the coil spring and a bottom follower with a shoe carrier extending within said barrel portion and supporting friction shoes for engagement with said barrel portion.

In the before-mentioned modifications, I may arrange the friction surfaces in spaced parallel planes or in converging or diverging planes as befits the purpose to be accomplished, and a definite object of my invention is to devise a snubber particularly suitable for acomplishing either of the last-mentioned objects. In other words, my novel device may readily be modified to produce a relatively constant friction for given stroke up or down, or it may be as easily arranged to afford an increase in friction on the down stroke or on the up stroke, as may be suitable to the particular requirements.

In the drawing,

Figure 1 is a side elevation of one modification of my device, half in section, the section being taken substantially in the plane bisecting the device along the diameter at right angles to the friction shoes substantially as indicated by the line 1—1 of Figure 2.

Figure 2 is a top plan view of the structure shown in Figure 1, half in section, the section being taken in the horizontal plane indicated by the line 2—2 of Figure 1.

Figure 3 is a fragmentary view corresponding to the sectional portion of Figure 2 showing an alternate arrangement of friction surfaces.

Figure 4 shows another modification of my invention generally similar to that shown in Figure 1 but differing therefrom in affording tapering friction surfaces instead of vertical, and Figure 5 shows another modification similar to that of Figure 4 except that the taper of the friction surfaces is in the reverse direction.

Describing my novel invention in detail and referring first to the modification shown in Figures 1 and 2, the structure comprises a top follower generally designated 2, the outer face of which may conveniently form a seat 4 for one end of the device, said seat being interrupted centrally of the base by the opening 5 which may serve as positioning means therefor. Said follower may have an integral inwardly directed barrel portion 6 and the base may conveniently extend beyond said barrel portion to form an annular flange 8 affording a seat as at 10 for one end of the coil spring 12, the inner diameter of which may conveniently afford slight clearance as at 14 from the outer circumference of the friction barrel 6. The opposite end of the coil spring 12 may be seated as at 16 on the annular flange 18 formed around the circumference of the base 20 of the bottom follower 22, said bottom follower having an inwardly directed annular flange 24 serving as positioning means for said coil. The outer face of the base 20 may form a seat 26 for the opposite end of the snubber, and centrally formed in said base may be the opening 28 affording positioning means for the device when used in conjunction with a lug on an associated supporting member (not shown). Upwardly projecting from the bottom follower 22 and centrally formed thereon may be the shoe carrier 30, said carrier being in the form of a rectangular panel having adjacent the base thereof and on each side a horizontal flange 32 extending within the adjacent friction shoe 34 and affording positioning means therefor in manner best seen in the sectional view of Figure 2. The top of the carrier 30 may be formed as a flat surface affording bearing as at 36 for the projecting portion 38 of the top wall 40 of said friction shoe, said friction shoe being formed as a hollow structure approximately in the form of a half cylinder, the outer surface of which may have frictional engagement as at 42 with the friction face 44 formed entirely around the inner surface of the barrel portion 6 of the top follower.

Housed within each friction shoe may be a resilient pad 46, said pad being formed to the general shape of the cavity within the shoe and positioned with repect to said shoe by the elongated lug 48 centrally formed on the inner face thereof. Said rubber pad or compression spring 46 may have flat face engagement as at 50 with one face of the carrier 30 and be positioned with respect thereto by the elongated lug 52 thereon.

It will be seen that each shoe 34 is fixed against vertical movement with respect to the shoe carrier 30 on which it is supported, and each shoe has a cylindrical friction surface in engagement with the complementary friction face formed around the barrel 6. Inasmuch as a winding and unwinding action takes place when a coil spring is compressed or released, this action of the spring may tend to rotate one follower with respect to the other and thus afford equal wear of said friction shoes around the friction surface on the barrel.

The modification shown in Figure 3 differs from that shown in Figure 2 in that the barrel 102 of the top follower 104 is formed at each side thereof with a channel-shaped friction surface comprising a plurality of flat faces merging along their adjacent edges to form said channel friction surfaces against which may be seated as at 106 the complementary face of the friction shoe 108, said friction shoe being otherwise similar to that of the modification just described and including central positioning means 110 for the rubber spring 112, the opposite face of which may seat as at 114 against the carrier 116 which is also formed with positioning means 118 for the rubber spring 112. The carrier 116 is likewise formed with a flange 120 affording the guide for the adjacent shoe 108.

The modification shown in Figure 4 differs from that shown in Figures 1 and 2 in the character of the engaging friction surfaces between the friction barrel and enclosed friction shoes. In the modification now under consideration, the top follower 202 affords a seat around its inner perimeter as at 204 for the coil spring 206, and the outer face of said follower is interrupted by the central opening 208 affording positioning means therefor. The inwardly directed friction barrel 210 integrally formed with the follower 202 has a cylindrical outer surface somewhat less in diameter than the inner diameter of the coil spring 206 to afford slight clearance with respect thereto as at 212. The inner surface of the barrel 210 is formed as a continuous friction face 211 therearound, said face having the form of a truncated cone and said barrel having an annular channel 213 around the upper portion thereof affording relief from the top edge 214 of the before-mentioned friction face. The opposite end of the coil spring 206 may seat as at 216 on the bottom follower 218, and positioning means for said spring may be formed on said follower as an annular flange 220 while a central opening 222 in the base of said bottom follower may afford positioning means therefor. As in the modification previously described, the bottom follower 218 has the integrally formed shoe carrier 224 upwardly projecting centrally thereof with the shoe positioning flange 226 extending transversely thereacross adjacent the base thereof, said carrier having a T-section top portion 228 affording abutment as at 230 for the top wall 232 of the shoe 234. The shoe has a shape generally similar to that of the modification shown in Figure 1, but differs therefrom in that the friction surface formed on the back thereof is complementary to that of the friction face 211 on the inner face of the barrel 210 against which it may seat as at 236. Between the shoe 234 and the carrier 224 may be confined the rubber spring 238, said spring being positioned with respect to said shoe by means of the lug 240 on said shoe and positioned with respect to said carrier by means of the lug 242 on said carrier.

In this modification, a greater amount of friction is developed on the downward stroke than on the release stroke, as will be obvious since the rubber spring 238 must be further compressed as the top follower moves downwardly with respect to the shoe 234 which is fixed against vertical movement with respect to the bottom follower on which it is supported.

The modification of Figure 5 is generally similar to that of Figure 4 except that the taper of the friction surfaces is in the reverse direction. The modification now under consideration comprises the top follower 302, the coil spring 304, the friction barrel 306 with a friction surface 308 extending entirely around the inner surface thereof, said friction surface having a tapering form like that of an inverted truncated cone, and against said friction surface may seat as at 310 the complementary face formed on the back of the friction shoe 312. The friction shoe 312 may be supported from the carrier 313 centrally formed and upwardly projecting from the follower 314, said carrier 313 affording abutment for said shoe as at 316 and 318 in manner previously described. In this modification, likewise, the compression spring or rubber pad 320 affords means of urging each friction shoe 312 tightly into engagement with the friction face of the barrel 306. In this modification, there is an increment of friction on the upward stroke and a diminution thereof in the downward stroke, the reverse of the arrangement shown in the modification of Figure 4.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a snubber, spaced followers, a release spring therebetween, a housing integral with one of said followers extending within said spring with a cylindrical friction surface on the inner wall thereof, a carrier integrally formed with the other of said followers and supporting friction shoes in engagement with said surface, each of said shoes comprising a recess, resilient means under compression between said carrier and each of said shoes within the associated recess, said carrier and said shoes being rotatable with respect to said housing to permit said shoes to engage all portions of said friction surface, and engaging means on said shoes and said carrier to prevent relative vertical movement thereof, said engaging means being entirely disposed within said recesses.

2. In a snubber, spaced followers, a release spring therebetween, a housing integral with one of said followers extending within said spring with a cylindrical friction surface on the inner wall thereof, a carrier integrally formed with the other of said followers and supporting friction shoes in engagement with said surface, a recess in each shoe, resilient means under compression between said carrier and each of said shoes within the associated recess, said carrier and said shoes being rotatable with respect to said housing to permit said shoes to engage all portions of said friction surfaces, and means on said carrier entirely disposed within said recesses and substantially preventing relative movement between said carrier and said shoes.

3. In a snubber, spaced followers, a release spring therebetween, a housing integral with one of said followers extending within said spring with a cylindrical friction surface on the inner wall thereof, a carrier integrally formed with the other of said followers and supporting friction shoes in engagement with said surface, a recess in each shoe, resilient means under compression between said carrier and each of said shoes within the associated recess, and interlocking means on said carrier for said shoes, said interlocking means being entirely disposed within said recesses.

4. In a friction absorbing device, top and bottom followers, a coil spring therebetween, a friction barrel integrally formed with one of said followers and projecting within said spring, a carrier integrally formed with the other of said followers and supporting friction shoes in engagement with said barrel, a recess in each shoe, resilient means under compression between said carrier and said shoes within the associated recesses, positioning means on said carrier and said shoes for said resilient means, and means on the carrier interlocking said shoes therewith and entirely disposed within the associated recesses.

5. In a friction absorbing device, top and bottom followers, a coil spring therebetween, a member integral with one of said followers and supporting spaced friction surfaces within said spring, a carrier integrally formed with the other of said followers and supporting friction shoes in engagement with said surfaces, recesses in said shoes, resilient means under compression within said recesses between said carrier and each of said shoes and acting approximately at right angles to the axis of said coil spring, positioning means on said carrier and said shoes for said resilient means, and means interlocking said carrier with said shoes and disposed within the associated recesses.

6. In a friction device, opposed followers, a compression spring therebetween, one of said followers having a substantially cylindrical wall and the other of said followers having a wall in telescoping relation therewith, spaced friction means interposed between said walls, each of said friction means comprising a friction shoe having a recess and an associated resilient member within said recess and compressed between said shoe and one of said walls, positioning means on each shoe and an adjacent wall for the interposed resilient member, and stop means on the adjacent wall substantially preventing relative movement of said shoes with respect thereto, said stop means being entirely disposed within said recesses.

7. In a snubber, spaced followers, one of said followers having spaced friction surfaces and the other of said followers having a wall intermediate said surfaces in telescoping relationship therewith, a spring compressed between said followers and surrounding said surfaces and wall, friction means interposed between said wall and said surfaces, each of said friction means comprising a friction shoe having a recess housing an associated resilient member, and interengaging stop means on each shoe and one of said followers restricting relative vertical movement therebetween, said stop means being entirely disposed within said recesses.

8. In a snubber, spaced followers, one of said followers having a wall presenting opposed friction surfaces and the other of said followers having a wall intermediate said surfaces in telescoping relationship therewith, a spring compressed between said followers and surrounding said surfaces and wall, friction means interposed between said followers, each of said friction means comprising a shoe having a recess housing an associated resilient member, and interengaging stop means on each shoe and an adjacent wall restricting relative vertical movement therebetween, said stop means being entirely disposed within the associated recess and having telescopic relationship to compensate for wear and to permit lateral movement of said shoe under operating conditions.

9. In a friction absorbing device, a follower having a friction barrel with an internal friction surface, friction shoes engaged therewith and each comprising a recess, a resilient member positioned within each recess, a spaced follower comprising a stem intermediate said shoes and clamped between said resilient members, a flange on said stem within each recess, and a flange on each shoe overlapping said stem, said flanges substantially preventing relative vertical movement between said stem and said shoes, and resilient means for yieldingly resisting relative movement of said followers toward each other.

10. In a snubber, spaced followers, a release spring therebetween, a housing integral with one of said followers extending within said spring with opposed diagonal friction surfaces on the inner wall thereof, a carrier integrally formed with the other of said followers and supporting recessed friction shoes in engagement with said surfaces respectively, resilient means under compression between said carrier and each of said shoes within the adjacent recesses thereof, and interengaging means on said shoes and said carrier to prevent relative vertical movement thereof, said engaging means being disposed entirely within said recesses.

11. In a snubber, spaced followers, a release spring therebetween, a housing integral with one of said followers extending within said spring with opposed diagonally arranged friction surfaces on the inner wall thereof, said surfaces converging toward the open end of said housing, a carrier integrally formed with the other of said followers and supporting friction shoes in engagement with said surfaces respectively, a recess in each shoe, resilient means under compression between said carrier and each shoe within the recess thereof, and interlocking means on said carrier for said shoes disposed within the respective recesses thereof.

12. In a snubber, spaced followers, a release spring therebetween, a housing integral with one of said followers extending within said spring with opposed diagonally arranged friction surfaces on the inner wall thereof, said surfaces diverging toward the open end of said housing, a carrier integrally formed with the other of said followers and supporting friction shoes in engagement with said surfaces respectively, a recess in each shoe, resilient means under compression between said carrier and each shoe within the recess thereof, and interlocking means on said carrier for said shoes disposed within the respective recesses thereof.

13. In a friction absorbing device, a follower having a friction barrel with opposed tapering internal friction surfaces, friction shoes engaged therewith and each having a recess, a resilient member within each recess, a spaced follower having a friction stem clamped between said members intermediate said shoes, a flange on said stem within each recess, and a flange on each shoe overlapping said stem, said flanges substantially preventing relative vertical movement between said stem and said shoes, and resilient means for yieldingly resisting relative movement of said followers toward each other.

14. In a friction absorbing device, a follower having a friction barrel with opposed sloping friction surfaces, said surfaces converging toward the open end of said barrel, friction shoes engaged therewith and each having a recess, a resilient member within each recess, a spaced follower having a friction stem clamped between said members intermediate said shoes, a flange on said stem within each recess and a flange on each shoe overlapping said stem, said flanges substantially preventing relative vertical movement between said stem and said shoes, and resilient means for yieldingly resisting relative movement of said followers toward each other.

15. In a friction absorbing device, a follower having a friction barrel with opposed diagonal friction surfaces, said surfaces diverging toward the open end of said barrel, friction shoes engaged therewith and each having a recess, a resilient member within each recess, a spaced follower having a friction stem clamped between said members intermediate said shoes, a flange on said stem within each recess and a flange on each shoe overlapping said stem, said flanges substantially preventing relative vertical movement between said stem and said shoes, and resilient means for yieldingly resisting relative movement of said followers toward each other.

16. In a friction absorbing device, spaced followers, a compression spring therebetween, a housing integral with one of said followers extending within said spring with spaced friction surfaces on the inner wall thereof, a carrier integrally formed with the other of said followers and supporting friction shoes in engagement with said surfaces, a recess in each shoe, resilient means under compression between said carrier and each of said shoes within the associated recess, and interlocking means on said carrier for said shoes, said interlocking means being entirely disposed within said recesses.

17. In a friction absorbing device, spaced followers, a compression spring therebetween, a friction barrel integral with one of said followers and supporting spaced friction surfaces within said spring, a carrier integrally formed with the other of said followers and supporting friction shoes in engagement with said surfaces, a recess in each shoe, resilient means under compression between said carrier and each of said shoes within the associated recesses, and means on said carrier interlocking said shoes therewith and entirely disposed within the associated recesses.

ROBERT B. COTTRELL.